L. H. FERGUSON.
VEHICLE TIRE.
APPLICATION FILED AUG. 17, 1912.
1,083,245.
Patented Dec. 30, 1913.
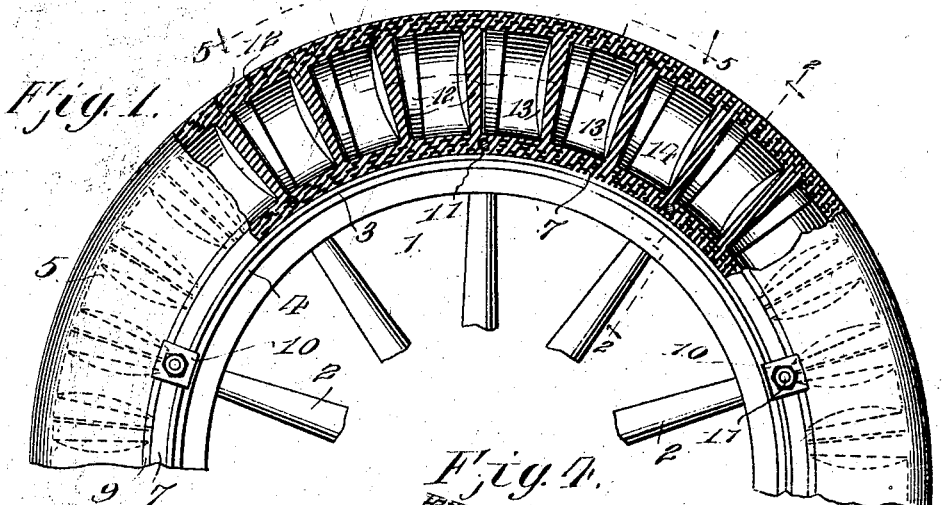
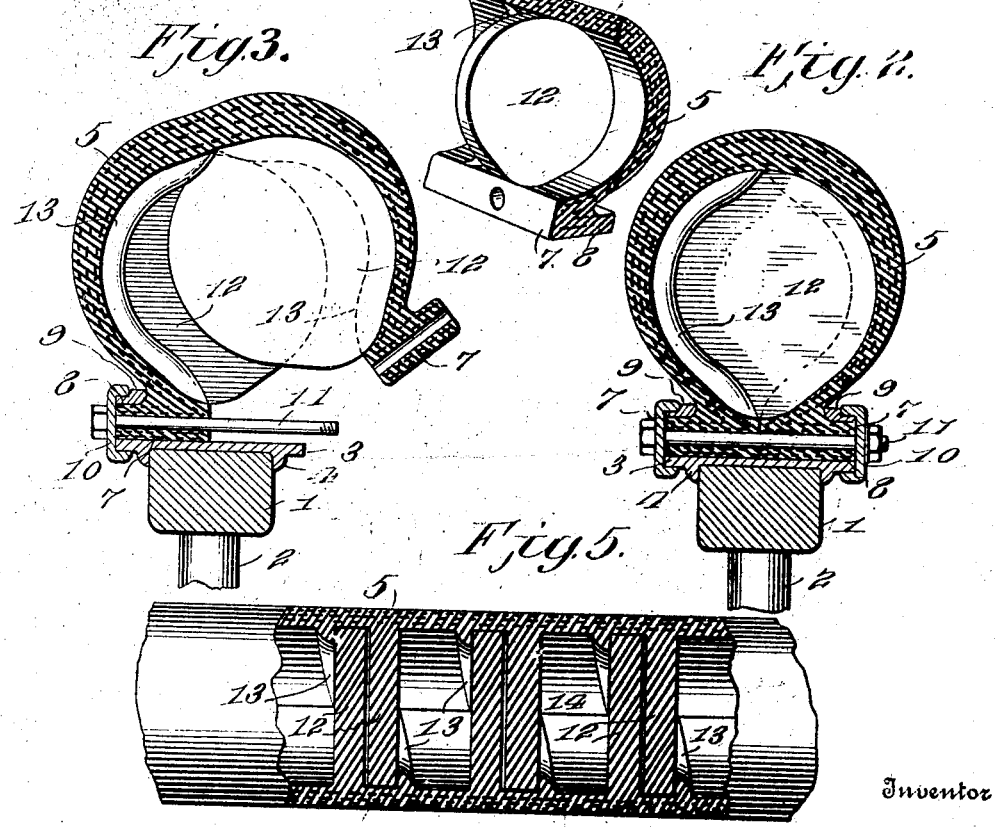
Inventor
Lyman H. Ferguson,
By Victor J. Evans
Attorney
Witnesses
Frank Hough

UNITED STATES PATENT OFFICE.

LYMAN H. FERGUSON, OF ITHACA, NEW YORK, ASSIGNOR OF ONE-THIRD TO QUINCY W. WELLINGTON AND TWO-THIRDS TO THOMAS F. ROGERS, EDWIN FORCE, AND CASIUS G. ANDREWS, ALL OF CORNING, NEW YORK.

VEHICLE-TIRE.

1,083,245. Specification of Letters Patent. Patented Dec. 30, 1913.

Application filed August 17, 1912. Serial No. 715,632.

*To all whom it may concern:*

Be it known that I, LYMAN H. FERGUSON, a citizen of the United States, residing at Ithaca, in the county of Tompkins and State of New York, have invented new and useful Improvements in Vehicle - Tires, of which the following is a specification.

This invention relates to vehicle tires and more particularly to cushion tires.

One of the principal objects of the invention is to provide a simple and efficient structure of this character which will absorb all shocks in as equally an efficient manner as the commonly used pneumatic tire.

Another object of the invention is to provide a tire having a plurality of partitions extending across the same and connected to one side of the tire only, the opposite edge being free and retained in place by an integral rib formed upon the opposite side of the tire and by a similar partition also connected to the opposite side and spaced from the rim.

A still further object of the invention is to construct a tire of this character having a plurality of transversely extending partitions so arranged that the tire may be eventually opened after molding to remove the core.

Further objects of the invention will appear as the following specific description is read in connection with the accompanying drawing which forms a part of this application and in which:

Figure 1 is a side elevation with parts broken away. Fig. 2 is a transverse sectional view on the line 2—2 of Fig. 1. Fig. 3 is a view similar to Fig. 2 with one half of the tire spread apart. Fig. 4 is a detail sectional perspective. Fig. 5 is a top plan view with parts broken away on line 5—5 of Fig. 1.

Referring more particularly to the drawing 1 represents an ordinary wheel and felly which is connected to the hub, not shown, by means of spokes 2 and is provided with a split rim 3 having flanges 4 to straddle the felly 1 and thereby prevent displacement. The tire is constructed in the manner of ordinary pneumatic shoes of an annular tubular body 5 thickened, as shown, on the tread portion and tapering gradually to the annular rim engaging flanges 7. These flanges are projected laterally as shown at 8 to permit the mounting of retaining rings 9 which are held in position by clips 10 and bolts 11 which extend parallel with the rim 3 and through the clips 10 and flanges 7 as shown in Fig. 2.

Formed integrally with the body 5 are partitions 12 which are connected to the body upon one of their sides only and are of sufficient diameter to extend entirely across the inside of the tire. These partitions are arranged in pairs and their connections with the body are alternated. In other words one partition is connected to one side and adapted to freely engage the opposite side, while the other partition of the pair is connected to the opposite side of the tire and extends across the interior of the same. Each partition has its free edge arranged between the opposite partition and a retaining rib 13 secured to the side of the tire as shown in Fig. 5 and spaced away from the adjoining partition of the pair so as to permit changes in thickness of the partition due to compression of the same. Each pair of partitions is of a thickness substantially equal to the space 14 between the pairs of partitions and these partitions are preferably constructed of sponge rubber while the tread portion of the tire is of vulcanized rubber reinforced in the usual manner.

I claim:—

A vehicle tire comprising an annular body circumferentially split, means to hold the body in tubular form upon the rim of a wheel, partitions alternately connected to the opposite sides of the body and extending across the interior of the same, said partitions being grouped in pairs and cushion ribs arranged adjacent one partition and adapted to coact with the connected edge of the said partition to hold the free edges of said partitions against displacement.

In testimony whereof I affix my signature in presence of two witnesses.

LYMAN H. FERGUSON.

Witnesses:
E. EDMONSTON, Jr.,
E. M. MARTIN.